(12) United States Patent
Starovic et al.

(10) Patent No.: US 10,113,507 B2
(45) Date of Patent: Oct. 30, 2018

(54) THRUST REVERSER CASCADE ELEMENT OF AN AIRCRAFT GAS TURBINE

(71) Applicant: Rolls-Royce Deutschland Ltd & Co KG, Blankenfelde-Mahlow (DE)

(72) Inventors: Aleksa Starovic, Berlin (DE); Moritz Kuhtz, Dresden (DE); Werner Hufenbach, Dresden (DE)

(73) Assignee: ROLLS-ROYCE DEUTSCHLAND LTD & CO KG, Blankenfelde-Mahlow (DE)

( * ) Notice: Subject to any disclaimer, the term of this patent is extended or adjusted under 35 U.S.C. 154(b) by 521 days.

(21) Appl. No.: 14/718,879

(22) Filed: May 21, 2015

(65) Prior Publication Data

US 2016/0047333 A1 Feb. 18, 2016

(30) Foreign Application Priority Data

May 26, 2014 (DE) .................. 10 2014 210 025

(51) Int. Cl.
*F02K 1/54* (2006.01)
*F02K 1/70* (2006.01)
*F02K 1/72* (2006.01)

(52) U.S. Cl.
CPC ............... *F02K 1/70* (2013.01); *F02K 1/72* (2013.01); *F02K 1/54* (2013.01); *F05D 2300/603* (2013.01); *F05D 2300/614* (2013.01); *Y02T 50/672* (2013.01)

(58) Field of Classification Search
CPC ............... F02K 1/70; F02K 1/72; F02K 1/54
See application file for complete search history.

(56) References Cited

U.S. PATENT DOCUMENTS

| 4,030,290 A | 6/1977 | Stachowiak |
| 4,278,220 A * | 7/1981 | Johnston ............ F02K 1/72 244/110 B |
| 4,596,621 A | 6/1986 | Nawaz |
| 4,722,821 A * | 2/1988 | Vermilye ......... B29C 45/14631 264/261 |
| 4,778,110 A * | 10/1988 | Sankey ............... F02K 1/605 239/265.29 |
| 4,852,805 A * | 8/1989 | Vermilye ......... B29C 45/14631 239/265.11 |

(Continued)

FOREIGN PATENT DOCUMENTS

| DE | 69420555 | 12/1999 |
| DE | 102011008917 | 7/2012 |

(Continued)

OTHER PUBLICATIONS

German Search Report dated Jan. 21, 2015 from counterpart App No. 10 2014 210 025.9.

(Continued)

*Primary Examiner* — Todd E Manahan
*Assistant Examiner* — Eric Linderman
(74) *Attorney, Agent, or Firm* — Shuttleworth & Ingersoll, PLC; Timothy J. Klima

(57) ABSTRACT

The present invention relates to a thrust reverser cascade element of an aircraft gas turbine with a rigid frame and with several thrust reverser profiles mounted in the frame, wherein the thrust reverser cascade element is made of fiber-plastic composite.

5 Claims, 5 Drawing Sheets

(56) References Cited

U.S. PATENT DOCUMENTS

Figure 1:
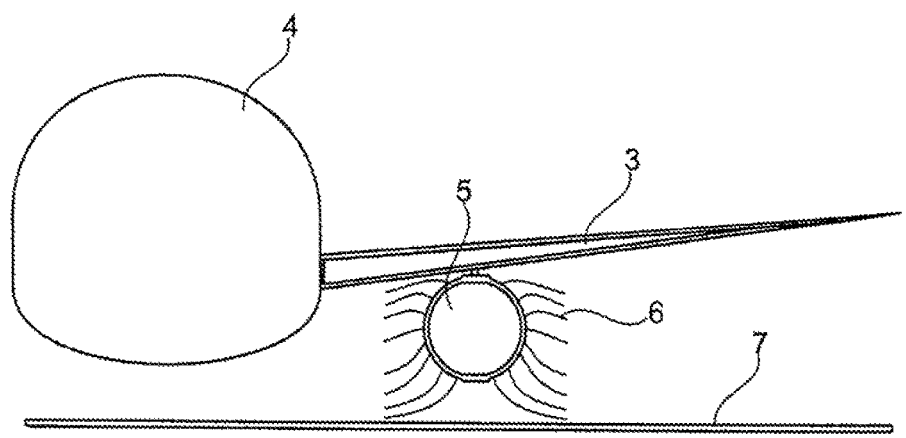

| | | | | |
|---|---|---|---|---|
| 5,228,641 | A * | 7/1993 | Remlaoui | F02K 1/72 239/265.31 |
| 5,485,958 | A * | 1/1996 | Nightingale | F02K 1/006 239/265.19 |
| 5,507,143 | A * | 4/1996 | Luttgeharm | F02K 1/563 239/265.31 |
| 6,725,541 | B1 * | 4/2004 | Holme | F02K 1/54 29/889.2 |
| 7,484,356 | B1 * | 2/2009 | Lair | F02K 1/72 60/226.2 |
| 9,109,462 | B2 * | 8/2015 | Suciu | F01D 21/045 |
| 9,328,694 | B2 * | 5/2016 | Todorovic | F02K 3/025 |
| 9,587,582 | B1 * | 3/2017 | Schaefer | F02K 1/72 |
| 9,835,112 | B2 * | 12/2017 | Calder | B33Y 80/00 |
| 9,895,840 | B2 * | 2/2018 | Bartel | B29C 53/824 |
| 2005/0229584 | A1 * | 10/2005 | Tweedie | F02K 1/72 60/226.1 |
| 2006/0005530 | A1 * | 1/2006 | Blin | F02K 1/625 60/226.2 |
| 2007/0261410 | A1 | 11/2007 | Frank et al. | |
| 2008/0187441 | A1 * | 8/2008 | Schreiber | B29C 70/202 416/229 R |
| 2009/0288386 | A1 * | 11/2009 | Marshall | F02K 1/09 60/204 |
| 2013/0025260 | A1 * | 1/2013 | Pitiot | F02K 1/70 60/226.2 |
| 2013/0092755 | A1 | 4/2013 | Aten et al. | |
| 2013/0156542 | A1 * | 6/2013 | Suciu | F01D 21/045 415/1 |
| 2013/0318945 | A1 | 12/2013 | Todorovic | |
| 2014/0030107 | A1 * | 1/2014 | Schreiber | F01D 5/147 416/241 A |
| 2014/0154064 | A1 | 6/2014 | Bouteiller et al. | |
| 2016/0201602 | A1 * | 7/2016 | Nakhjavani | F02K 1/72 239/1 |
| 2016/0263820 | A1 * | 9/2016 | Kruckenberg | B29C 66/301 |
| 2018/0179989 | A1 * | 6/2018 | Wadsworth | F02K 1/70 |

FOREIGN PATENT DOCUMENTS

| | | |
|---|---|---|
| DE | 102011008917 A1 | 7/2012 |
| WO | WO2013021110 A1 | 2/2013 |
| WO | WO2015080785 A2 | 6/2015 |
| WO | WO2015119740 A1 | 8/2015 |

OTHER PUBLICATIONS

European Search Report dated Oct. 6, 2015 for related European patent Application No. EP15168468.

* cited by examiner

THRUST REVERSER CASCADE ELEMENT OF AN AIRCRAFT GAS TURBINE

This application claims priority to German Patent Application DE102014210025.9 filed May 26, 2014, the entirety of which is incorporated by reference herein.

This invention relates to a thrust reverser cascade element of an aircraft gas turbine as disclosed herein.

In aircraft gas turbines the use is known, for the purpose of decelerating an aircraft after touch-down, of a thrust reverser device by means of which the airflow exiting the aircraft gas turbine, in particular its bypass duct, is diverted. For this purpose, it is known to either displace a rear area of an engine cowling in the axial direction or to open thrust reverser doors at the rear area. This makes it possible to use cascade elements which have deflecting devices or thrust reverser profiles to divert the exiting airflow. Designs of this type are known for example from DE 10 2011 008 917 A1 or U.S. Pat. No. 4,030,290 A.

The previously known thrust reverser elements are metallic structures provided with supports or supporting frames and having a plurality of bracing struts or the like. This results on the one hand in a high overall weight, and on the other hand in an unsatisfactory flow behaviour due to the previously known layout.

As mentioned, aircraft engines use thrust reverser systems for braking assistance, which on the one hand shortens the braking distance, which is particularly helpful when the runway is wet or slippery, and on the other hand the thrust reverser systems reduce wear on the brakes and wheels of the aircraft, since they are placed under less stress by the braking operations. This results in longer maintenance intervals for the brakes and wheels, which in turn entails cost savings.

The thrust reverser systems described deflect, as mentioned, the airflow exiting the aircraft gas turbine. As a result, the effect of the thrust reverser systems depends on the available outflow surface. With the grid-like cascade elements known from the state of the art, the airflow is deflected either axially or tangentially relative to the center axis of the aircraft gas turbine. This results in disadvantages in respect of the flow guidance, since with the designs known from the state of the art, in particular the upper and the lower areas of the aircraft gas turbine are used not at all or only partially for thrust reversal. The reason for this is that a flow onto the wing of the aircraft has to be avoided and that an outflow onto the surface of the runway is undesirable, as this swirls up dirt and dust particles. The systems known from the state of the art can thus use only a part of the circumference of the aircraft gas turbine for thrust reversal.

The object underlying the present invention is to provide a thrust reverser cascade element of an aircraft gas turbine of the type specified at the beginning which while being simply designed and easily and cost-effectively producible avoids the disadvantages of the state of the art and enables an optimized flow guidance.

It is a particular object to provide a solution to the above problems by a combination of features disclosed herein. Further advantageous embodiments of the present invention will be apparent from the present disclosure.

In accordance with the invention, it is thus provided that the thrust reverser cascade element is made of a fiber-plastic composite (FPC) and/or in a hybrid design with different materials.

The embodiment in accordance with the invention results in a number of considerable advantages. Fiber-plastic composites (fiber reinforced plastics) are characterized by high specific mechanical properties and permit a high degree of lightweight construction, enabling the thrust reverser cascade element in accordance with the invention to be manufactured with a very low weight.

The high mechanical strengths furthermore result in the possibility of achieving complex profile cross-sections and shapes of the thrust reverser profiles. It is for example possible to design thrust reverser profiles with several curves that can be twisted over their length when viewed in cross-section. It is thus possible to achieve an individual flow profile characterized by high efficiency. As a result, the thrust reverser cascade elements in accordance with the invention can be used in particular at areas of the aircraft gas turbine where no thrust reverser elements were used in the state of the art for flow technology reasons, for example at the upper or lower areas of the aircraft gas turbine. The combination of the material proposed in accordance with the invention and the possibility of optimized geometry of the thrust reverser profiles thus enables completely new solution approaches for thrust reversal, with particular advantages being created by the low weight of the thrust reverser cascade elements in accordance with the invention together with the flow-adapted design.

In a particularly favourable embodiment of the invention, it is provided that the thrust reverser profiles have a flow profile in cross-section and/or are arranged substantially parallel to one another. This arrangement and profile design result in an optimized mode of operation, leading to a considerable increase in the braking effect of an aircraft.

The thrust reverser cascade element in accordance with the invention has, in comparison with the state of the art, a considerably reduced number of individual parts since it is preferably designed in one piece, allowing both the overall weight and the production effort to be reduced. Due to the high mechanical strength of the thrust reverser profiles, it is sufficient in accordance with the invention to mount them in an outer frame. Further struts between the individual profiles are not required. This increases the effective flow surface, resulting in turn in an increase in efficiency.

The embodiment of the thrust reverser profiles as flow profiles and the possibility of three-dimensionally optimizing the individual thrust reverser profiles result in a further increase in the mechanical strength of the thrust reverser cascade element. The thrust reverser cascade element in accordance with the invention can be used in standard aircraft gas turbines instead of the cascade elements known from the state of the art, so that a wide range of applications is assured. The cascade element in accordance with the invention can be moved here either by means of lateral drive units or by means of a centrally arranged drive rail, making it suitable for a variety of thrust reverser designs.

Figure 6:
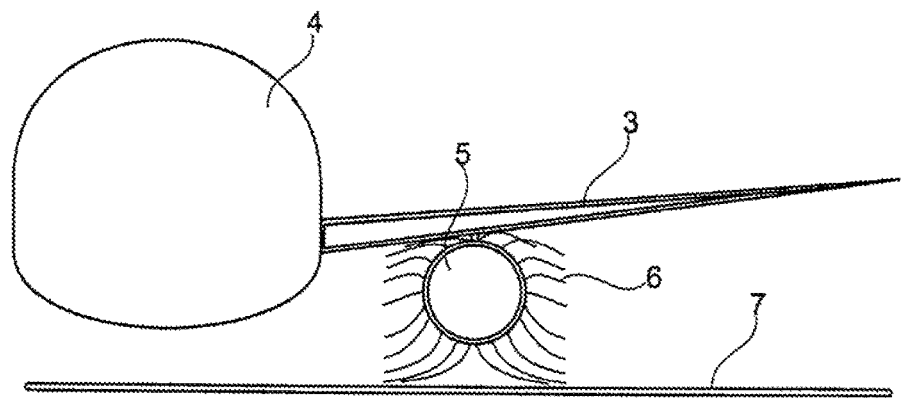
Figure 3:
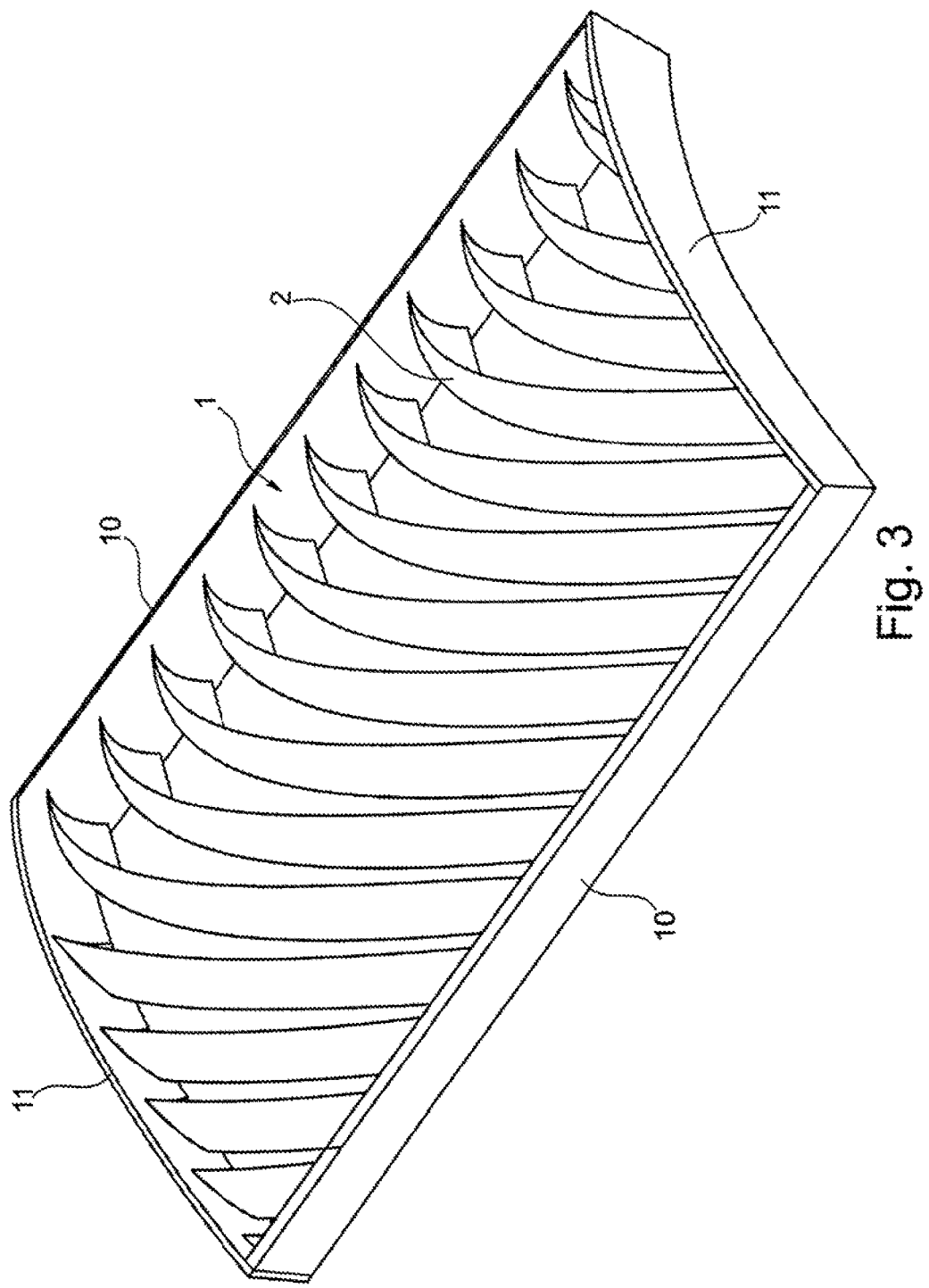
Figure 4:
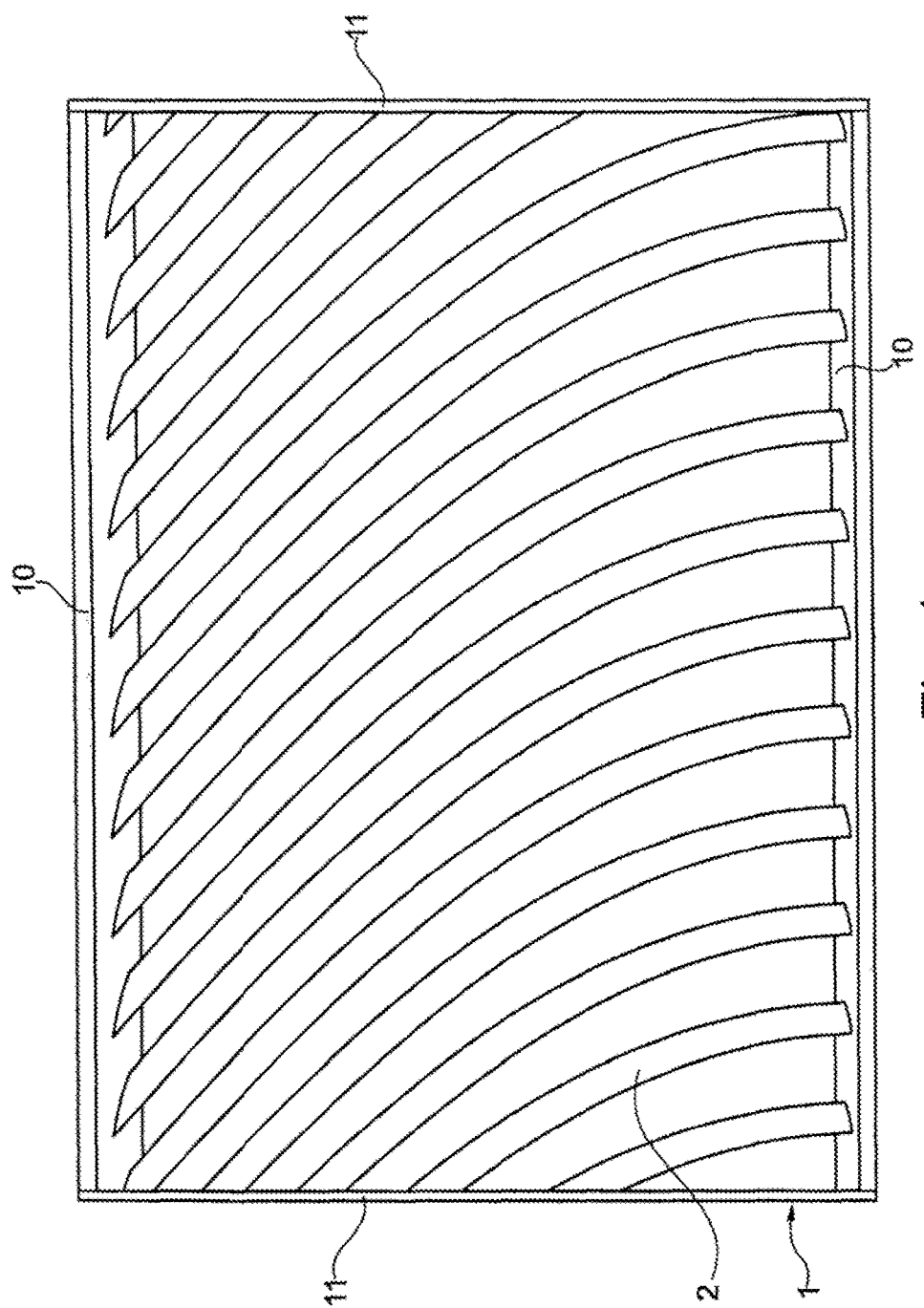
Figure 5:
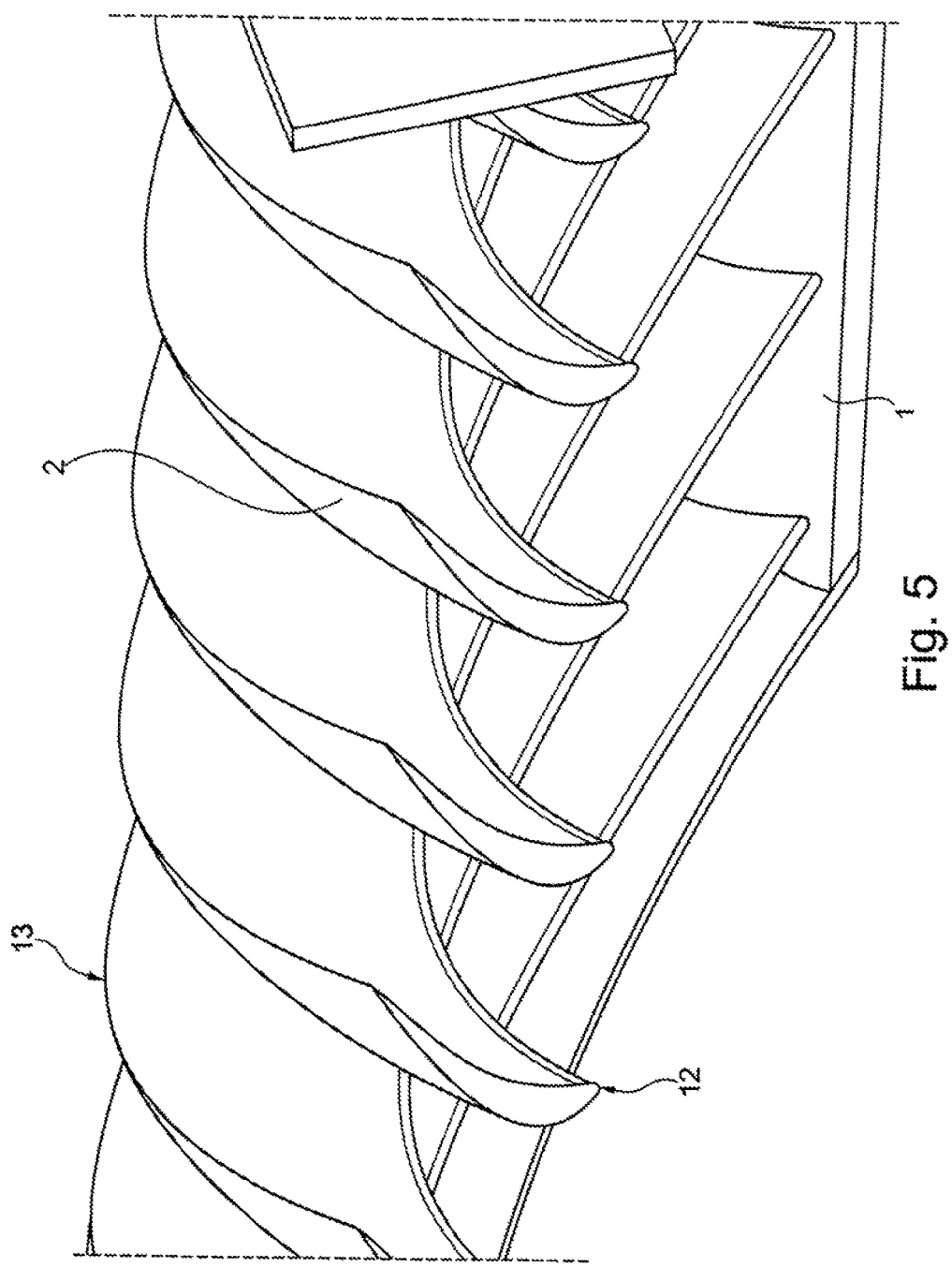

The present invention is described in the following in light of the accompanying drawing showing an exemplary embodiment. In the drawing, FIG. 1 shows a simplified partial front view of an aircraft with cascade elements and associated flow in accordance with the state of the art, FIG. 2 shows a simplified partial side view of an aircraft gas turbine in accordance with the present invention with thrust reverser cascade elements in accordance with the present invention, FIG. 3 shows a perspective representation of a thrust reverser cascade element shown in FIG. 2, FIG. 4 shows a top view onto the embodiment as per FIG. 3, FIG. 5 shows a perspective partial sectional view through thrust reverser profiles, and FIG. 6 shows a representation, by analogy with FIG. 1, of the flow guidance resulting in accordance with the present invention.

FIG. 1 shows in a schematic front view part of an aircraft, i.e. a wing 3, which is fastened to a fuselage 4 and which supports an aircraft gas turbine 5. The aircraft gas turbine 5 is shown in the thrust reversal state. FIG. 1 shows the exiting flow lines 6. It can be seen here that the upper and lower areas of the aircraft gas turbine 5 cannot be used for thrust reversal, in order to avoid a direct flow onto the underside of the wing 3 and the surface of the runway 7. This has the consequence that a not inconsiderable circumferential area of the aircraft gas turbine 5 cannot be used for thrust reversal.

Figure 2:
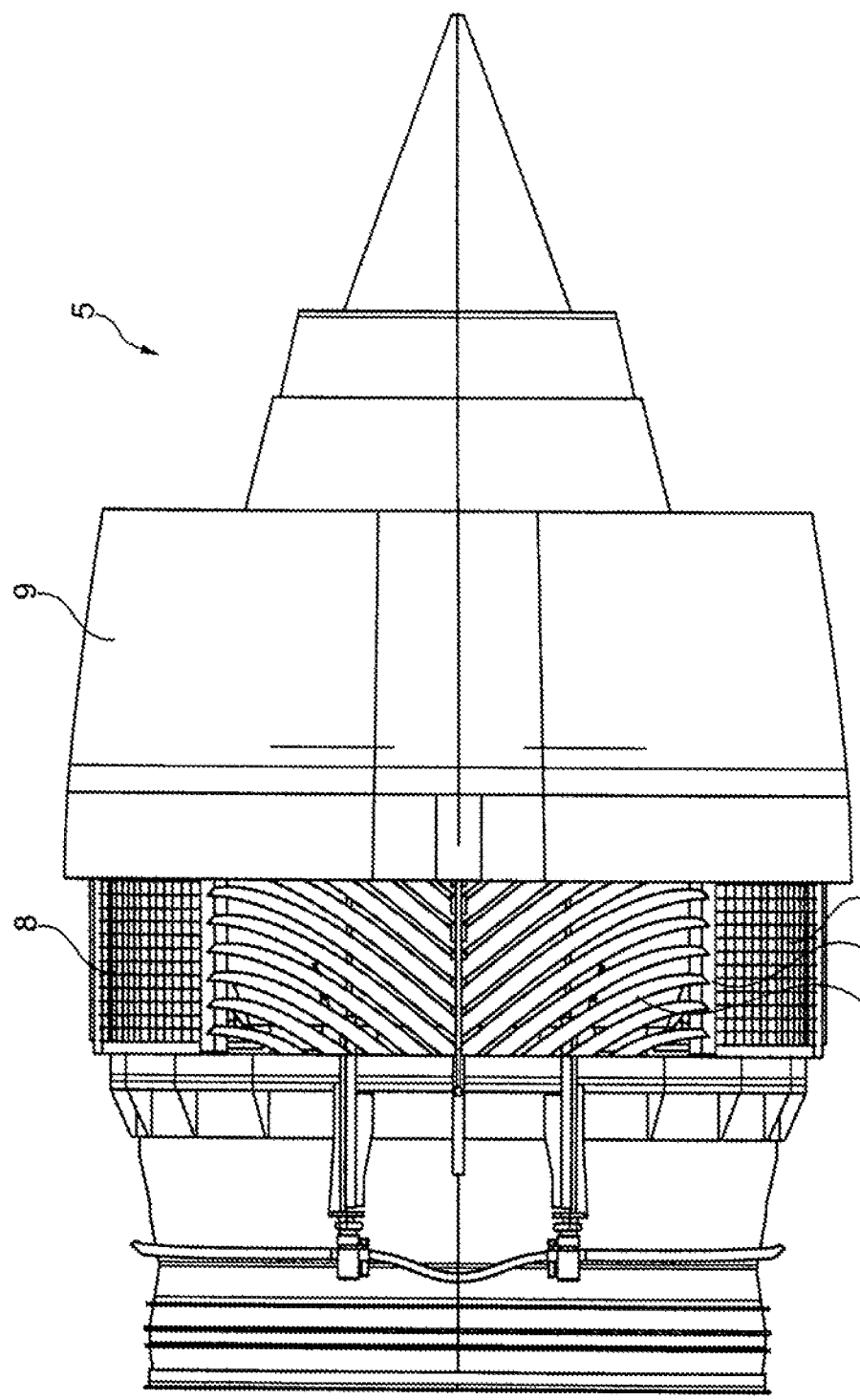

FIG. 2 shows a partial view of an aircraft gas turbine 5 in the thrust reversal position, in which a rear engine cowling 9 has been axially displaced to create an outlet surface for a thrust-reversing flow. FIG. 2 shows an embodiment in which conventional cascade elements 8 are used too. As is known for example from DE 10 2011 008 917 A1, the latter are designed grid-like and have a plurality of struts. This reduces the available flow surface, resulting in the disadvantages discussed in the above.

FIG. 2 shows in the center area of the aircraft gas turbine 5 two thrust reverser cascade elements in accordance with the present invention. They have a rigid frame 1 in which several thrust reverser profiles 2 are arranged.

FIGS. 3 to 5 show in a perspective representation (FIG. 3), in a top view (FIG. 4) and in a perspective sectional view (FIG. 5) an exemplary embodiment of a thrust reverser cascade element in accordance with the invention. This includes a rigid and closed frame 1 inside which a plurality of thrust reverser profiles 2 are arranged in one piece. The thrust reverser profiles 2 are substantially parallel to one another, as is shown in FIG. 4. Both the frame 1 and the thrust reverser profiles 2 are manufactured from a fiber-plastic composite (FPC).

As can be inferred from FIGS. 3 to 5, it is possible to optimize the geometry of the thrust reverser cascade element in accordance with the invention. The frame is here designed for example, as shown in FIG. 3, such that it has two opposite and straight frame struts 10, while the two other frame struts 11 are curved in order to adapt them to the circumferential rounding of the aircraft gas turbine (see FIG. 2). Accordingly, the thrust reverser profiles 2 have a three-dimensionally optimized shape and form effective flow profiles. The thrust reverser profiles 2 can be designed arched or curved, as is shown in the top view of FIG. 4. This leads to stiffening and to an increase in the mechanical strength of the individual thrust reverser profiles. It is furthermore possible, as shown in FIG. 5, to design the thrust reverser profiles 2 as optimized flow profiles with a leading edge 12 and a trailing edge 13.

This results not only, as in the state of the art, in a mere flow diversion of the thrust-reversing airflow, but also in a considerable increase in efficiency due to the optimized cross-sections of the thrust reverser profiles 2, which thus have a suction side and a pressure side and hence lead to a greater transmission of force.

Overall, the result in accordance with the invention is thus a simplified geometrical embodiment, a lower weight, lower manufacturing costs, simpler maintenance options and increased efficiency of the thrust reverser. The increase in the efficiency results in particular from the fact that larger air quantities can be deflected efficiently for thrust reversal.

FIG. 6 shows a view by analogy with FIG. 1. It can be seen here in particular that the thrust reverser cascade elements in accordance with the invention are arranged at areas of the aircraft gas turbine 5 where no thrust reversal was possible according to the state of the art in view of flow guidance, in particular at the upper and lower areas of the aircraft gas turbine according to the representation in FIG. 6.

LIST OF REFERENCE NUMERALS

1 Frame
2 Thrust reverser profile
3 Wing
4 Fuselage
5 Aircraft gas turbine
6 Flow line
7 Runway
8 Conventional cascade element
9 Engine cowling
10 Frame strut
11 Frame strut
12 Leading edge area
13 Trailing edge area

What is claimed is:

1. A thrust reverser cascade of an aircraft gas turbine, comprising:
   first and second thrust reverser cascade elements, each comprising:
      a rigid frame comprising two opposite straight frame struts and two opposite curved frame struts;
      a plurality of thrust reverser profiles fixed to and formed as one piece with the rigid frame, each of the plurality of thrust reverser profiles having opposite ends and a central portion extending from one of the opposite ends to another of the opposite ends;
      wherein the plurality of thrust reverser profiles are connected only at the opposite ends to the rigid frame;
      wherein the central portions of the plurality of thrust reverser profiles are free from the rigid frame except through the opposite ends;
      wherein each of the plurality of thrust reverser profiles is free from the others of the plurality of thrust reverser profiles except through the opposite ends;
      wherein each of the plurality of thrust reverser profiles is arched or curved in a longitudinal direction of the each of the plurality of thrust reverser profiles;
      wherein the first and second thrust reverser cascade elements are made from fiber reinforced plastic;
   wherein the first and second thrust reverser cascade elements are arranged side-by-side with one another such that one of the two opposite straight frame struts of the first thrust reverser cascade element is positioned adjacent one of the two opposite straight frame struts of the second thrust reverser cascade element to thereby form a centerline between the first and second thrust reverser cascade elements, the centerline being parallel with an axis of the aircraft gas turbine, the plurality of thrust reverser profiles of the first and second thrust reverser cascade elements converging together toward the centerline such that the plurality of thrust reverser profiles of the first thrust reverser cascade element form a mirror image with the plurality of thrust reverser profiles of the second thrust reverser cascade element.

2. The thrust reverser cascade in accordance with claim 1, wherein the plurality of thrust reverser profiles are arranged substantially parallel to one another.

3. The thrust reverser cascade in accordance with claim 1, wherein each of the plurality of thrust reverser profiles includes a flow profile in cross-section.

4. The thrust reverser cascade in accordance with claim 1:
wherein a first portion of the plurality of thrust reverser profiles are connected between a first one of the two opposite curved frame struts and a first one of the two opposite straight frame struts;
wherein a second portion of the plurality of thrust reverser profiles are connected between the first one of the two opposite straight frame struts and a second one of the two opposite straight frame struts;
wherein a third portion of the plurality of thrust reverser profiles are connected between the second one of the two opposite straight frame struts and a second one of the two opposite curved frame struts.

5. The thrust reverser cascade in accordance with claim 1 and further comprising a plurality of further thrust reverser cascade elements, each of the further thrust reverser cascade elements including a plurality of thrust reverser profiles arranged in a rectangular grid.

\* \* \* \* \*